Figure 1:
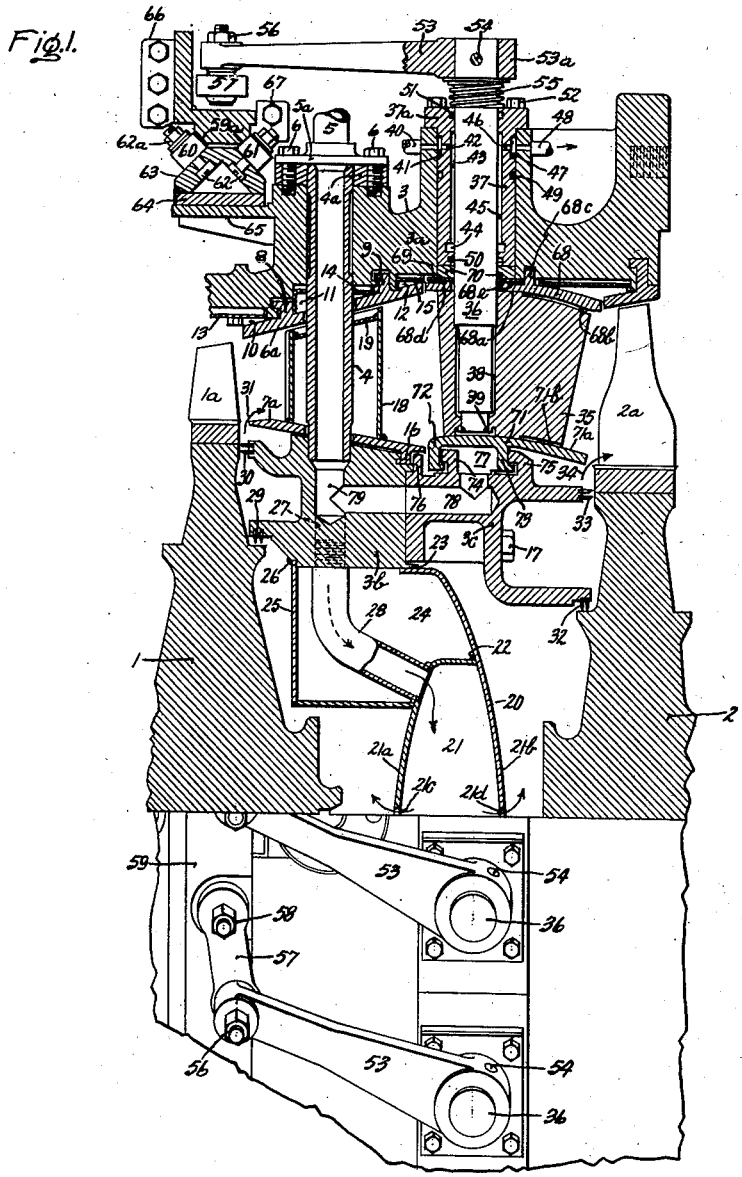

Inventors:
Bruce O. Buckland,
Glenn B. Warren,
by Ernest H. Britton
Their Attorneys.

Sept. 8, 1953  B. O. BUCKLAND ET AL  2,651,496
VARIABLE AREA NOZZLE FOR HIGH-TEMPERATURE TURBINES
Filed Oct. 10, 1951  2 Sheets-Sheet 2
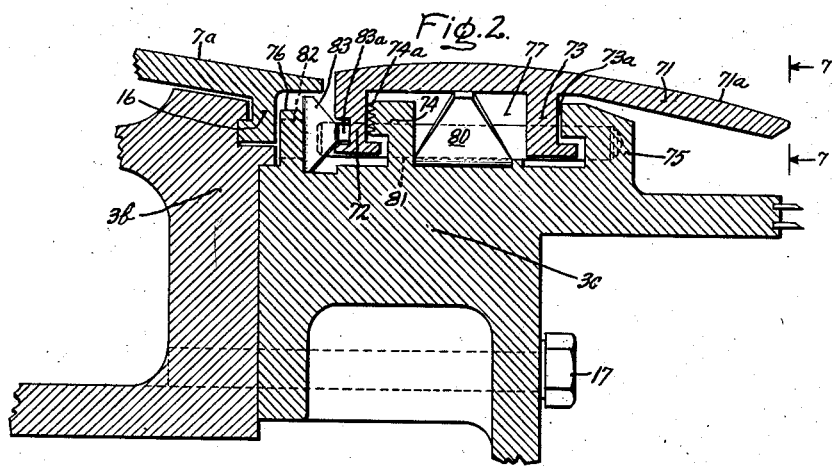
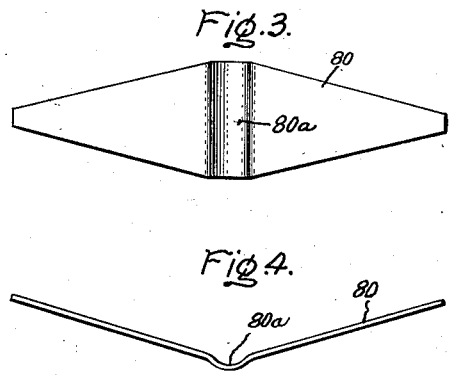
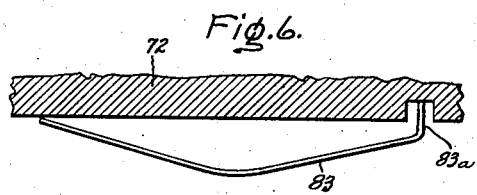
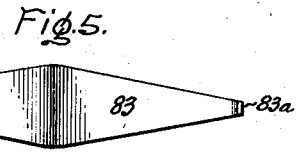
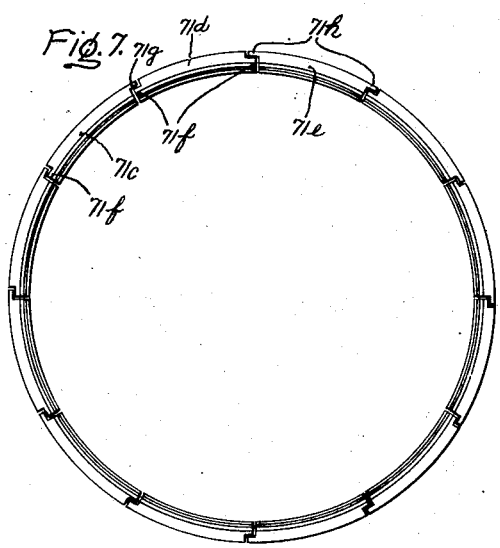
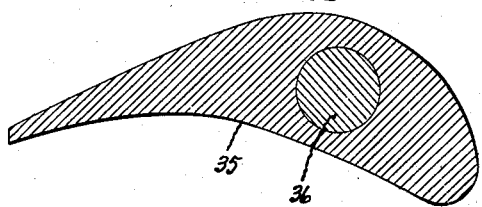
Inventors:
Bruce O. Buckland,
Glenn B. Warren,
by  *Ernest C. Britton*
Their Attorney.

Patented Sept. 8, 1953

2,651,496

UNITED STATES PATENT OFFICE 2,651,496

VARIABLE AREA NOZZLE FOR HIGH-TEMPERATURE TURBINES

Bruce O. Buckland, Schenectady, and Glenn B. Warren, Niskayuna, N. Y., assignors to General Electric Company, a corporation of New York Application October 10, 1951, Serial No. 250,738

5 Claims. (Cl. 253—78)

This invention relates to adjustable nozzles for high temperature turbines, as in gas turbine power plants where it is necessary to effect optimum turbine efficiency over a wide range of conditions.

It has for some time been appreciated by gas turbine designers that, in a turbine intended for operation over a wide range, it is highly desirable that the effective area of the turbine nozzles be adjustable, in order to obtain better performance at light load conditions, better control in the event of overspeed, improved operation at varying ambient temperatures, to permit a reduction in the power required to start the plant, and for various other reasons. In steam turbine design, this has been accomplished by subdividing the nozzle ring into a plurality of arcuate segments and separately controlling the flow of motive fluid to the respective segments by valves, which are successively opened as the load output is increased. Although not the most efficient way to effect nozzle area variation, this expedient has been widely adopted because of its mechanical simplicity, as compared with the extreme difficulties encountered in building a nozzle structure which will continuously vary the area of the whole nozzle ring.

In gas turbine design, where the overall efficiency of the power plant is intimately related to the thermal efficiency of the turbine per se, it is of the utmost importance that all available means be used to obtain every slightest improvement possible in turbine efficiency. In such power plants, turbine efficiency is therefore sufficiently important as to warrant the increased mechanical complexity required to make the entire nozzle ring of continuously variable area, between certain limits.

Accordingly, the object of the present invention is to provide a high temperature gas turbine nozzle ring arrangement in which the separate nozzle blades may be rotated through a limited arc to vary continuously the effective area of the entire nozzle ring.

Another object is to provide a variable turbine nozzle of the type described, arranged to permit the substantial differential thermal expansion which must take place between the nozzle blades and the associated annular walls between which the nozzle blades are supported, without imposing excessive stresses on either blades or supporting members.

A further object is to provide a variable nozzle in which clearances are provided between the respective moving parts of the nozzle proper, with special arrangements for keeping these clearances free of dirt to prevent binding of the movable parts, while at the same time maintaining these clearances at a preselected minimum value which remains substantially constant for all positions of the adjustable blades.

Other objects and advantages will become apparent from the following description taken in connection with the accompanying drawings, in which Fig. 1 is a partial longitudinal section of a multi-stage axial flow gas turbine having a nozzle ring incorporating the invention interposed between two stages, Fig. 2 is an enlarged detail view showing the resilient supporting arrangement for the inner wall of the motive fluid path, Figs. 3–6 inclusive are detail views of the spring biasing means incorporated in the resilient inner wall support, Fig. 7 is a detail end view of the inner segmental nozzle wall, taken on the plane 7—7 in Fig. 2, and Fig. 8 is a cross section view of one nozzle blade.

Generally, the invention is practiced by supporting the adjustable nozzle blades between inner and outer segmental walls which have spherical surfaces cooperating with the ends of the blades. Special spring and air pressure biasing means are provided for maintaining constant the clearances between the blades and wall segments.

Referring now more particularly to Fig. 1, the invention is shown as applied to a turbine having two mechanically independent rotors, 1 and 2, supported in a common casing 3. The respective bucket-wheels are provided with circumferential rows of radially extending blades 1a, 2a, and are supported in separate bearings (not shown). The detailed structure of the bucket-wheels and the method of fastening the blades to the disks are not material to an understanding of the present invention and, therefore, will not be discussed further herein.

The casing arrangement includes an outer casing member indicated generally at 3a and an inner casing assembly 3b. To facilitate manufacture and assembly, the outer casing member 3a is formed in two or more arcuate segments bolted together, while the first inner casing member 3b is a solid continuous ring. This inner casing 3b is supported from the outer casing 3a by a plurality of radially extending hollow studs 4. Specifically, there are six of the tubular studs 4, and the passages therethrough serve as conduits for air under pressure, as described more particularly hereinafter. It will be apparent from Fig. 1 that each stud 4 has a radially extending flange 4a welded to or formed integral with the outer end thereof. The flanged end 5a of suitable air inlet conduits 5 abut the outer faces of the flanges 4a. The flange portions 4a, 5a are secured to the split casing 3a by a plurality of threaded fastenings 6.

The inner and outer walls of the motive fluid flow path upstream from the nozzle ring are formed by segmental wall portions 6a, 7a. The outer wall segments, of which there may be twelve, for instance, are provided with axially spaced tongues or dovetails 8, 9. These dovetails position the segments 6a in a radial and in the axial direction. Assembly of the segments into their annular groove in casing 3a is permitted by the fact that this casing is split along one or more axial planes, as noted above.

In order to reduce the transfer of heat from the hot outer wall segment 6a to the casing member 3a, the segments engage the casing only in the neighborhood of the dovetail supporting portions 8, 9, there being circumferential spaces between segment and casing as indicated at 10, 11, 12. These dovetails 8, 9 extend circumferentially only a small portion of the complete circumference, which further reduces the heat flow to the casing, also reducing the bending stress in the segments. In order to prevent the circulation of hot motive fluid into these circumferential spaces and past the segments, the spaces are occupied by thin sheet metal rings of Z-shaped cross-section, as shown at 13, 14, 15. These rings also define additional dead-air spaces between their outer surfaces and the adjacent wall of casing 3a so as to function as radiation shields, further reducing the transfer of heat by radiation and convection from the hot segments 6a to the casing 3a.

The inner wall segments 7a are likewise supported by a tongue or dovetail portion 16. Since the first inner casing 3b is an integral structure, not split as is the outer casing 3a, assembly of the segment 7a is permitted by the fact that the inner casing 3b is detachably connected by screws 17 to a second separately fabricated inner casing member 3c, which is also an integral annular ring.

In order to reduce the transfer of heat from the motive fluid to the supporting stud and air conduit members 4, a streamlined shroud 18 is disposed around each stud 4. The shrouds 18 may be loosely disposed between the inner and outer segments 7a, 6a, or they may be welded to one of the segments. As disclosed in Fig. 1, the shroud 18 is welded to the inner segment 7a and has an end plate member 19 welded in the outer end of the shroud and having a central opening through which the stud 4 passes with a very small clearance therebetween. There is sufficient clearance between the end of the shroud 18 and the adjacent wall of segment 6a that differential thermal expansion of the shrouds will not completely close up this clearance and impose axial compressive forces on the comparatively thin shrouds. Because of this clearance between shroud 18 and segment 6a, and that between segment 6a and stud 4, the sheet metal annular shield 14 is particularly necessary to prevent heat transmission to the shells by hot motive fluid leaking outward and inward along the surface of the stud 4.

In order to supply cooling air to the downstream face of the first bucket-wheel 1 and the upstream face of the second bucket-wheel 2, the inner casing ring 3b is provided with a sheet metal casing indicated generally at 20. This casing has a central chamber 21 defined between axially spaced plates 21a, 21b. Plate 21a is welded to plate 20 as shown at 22 and the outer circumference of plate 21b may be tack-welded to the inner circumference of casing 3b, as shown at 23. Casing 20 also defines an outer annular chamber 24 formed by an annular member 25 which may be tack-welded to casing member 3b as shown at 26. Cooling air is supplied to the central chamber 21 through one or more of the hollow studs 4, to passages indicated in dotted lines at 27, Fig. 1, and by way of a connecting tube 28. It will, of course, be appreciated that the drilled hole 27 and tubes 4 and 28 with which it communicates are actually behind the plane of Fig. 1, since other passages (to be described hereinafter) are shown in full lines as being in the plane of Fig. 1.

Cooling air supplied at a suitable pressure through the studs 4 to the central chamber 21 is admitted to the spaces adjacent the respective bucket-wheels 1, 2 by restricted central openings 21c, 21d. The shroud wall portion 25 causes the cooling air from port 21c to flow in close contact with the downstream face of wheel 1, and the flow of hot motive fluid backward into this space is limited by circumferential packing rings 29, 30 secured to radially spaced portions of the casing member 3b and forming close clearances with circumferential surfaces on the wheel 1. Cooling air from the annular space adjacent wheel 1 eventually leaks outward into the motive fluid flow path as indicated by arrow 31 in Fig. 1. Likewise, cooling air from the port 21d flows over the upstream face of the second stage wheel 2, past sealing rings 32, 33 and enters the motive fluid flow path as indicated by arrow 34. Thus it will be seen that the turbine wheels are cooled by separate air streams from chamber 21. The flow is equalized circumferentially around the wheels by the generously proportioned concentric annular spaces defined between the walls 21a, 25, 3b, 7a and wheel 1, and walls 21b, 3c, 7a and wheel 2, respectively.

This invention particularly relates to the adjustable nozzle blades for the second stage buckets 2a, shown at 35 in Fig. 1. Each adjustable blade 35 is secured to a rod 36 supported for limited rotational movement in a bushing assembly 37. The adjustable vanes or blades 35 may be forged, machined from bars, or fabricated from sheet metal. As shown in Fig. 1, they are solid forged or cast blades, having an air-foil cross section of the shape shown in Fig. 8. In order to reduce heat transfer from the blades 35 to the rods 36, the rod forms a substantial clearance space throughout a large portion of its length which projects into the blade, as indicated at 38 in Fig. 1. The extreme inner end portion of the rod 36 is welded as shown at 39 to a circumferential lip formed in a recess in the end of the blade. Thus, the blade 35 is permitted to expand longitudinally relative to the rod 35, while the rod is kept comparatively cool by reason of conduction of heat along the rod, taken in combination with the restricted rate of heat transfer from blade to rod.

The bushing assembly 37 is cooled by water, which may be admitted through a supply conduit 40. This coolant enters an arcuate groove 41 formed in the outer surface of bushing 37 whence it flows by one or more radial holes 42 into one or more longitudinally extending grooves 43. At the inner ends thereof, the grooves 43 communicate with an annular groove 44, which in turn communicates with axially extending grooves 45. Radial holes 46 conduct the used coolant to an arcuate groove 47 whence it leaves by drain conduit 48. The supply conduits 40 and drain conduits 48 for the respective bushings 47 are, of course, connected by circumferential manifolds which may be either external pipes (not shown) or, alternatively, may be formed as circumferential passages in the casing 3a (not shown). Flow of coolant inward between bushing 37 and casing 3a is prevented by a packing ring seal 49, and leakage of coolant between rod 36 and bushing 37 is prevented by additional packing rings 50, 51. The outer end of bushing 37 is provided with a radial flange 37a secured by threaded fastenings 52 to the outer end of a boss formed integral with casing 3a.

The means for adjustably positioning the rods 36 includes an axially projecting lever member 53 having one end pinned to the outer end of rod 36 as indicated at 54. A coil spring 55 is interposed between the outer face of flange 37a and the adjacent face of rod end portion 53a. This spring helps to take up looseness between the respective nozzle parts during assembly and when the plant is shut down. The other end of each control lever 53 is pivoted at 56 to a link 57 which is in turn pivoted at 58 to a control ring 59, which ring extends entirely around the outer circumference of the power plant. The arrangement of levers 53, links 57 and the control ring 59 may be seen more clearly in the elevation view shown in the lower portion of Fig. 1. The control ring 59 is rotatably supported by a plurality of circumferentially spaced rollers 60, 61 as shown in the upper sectional portion of Fig. 1. These rollers engage inclined annular surfaces 59a formed on the inner circumference of ring 59 as will be apparent in Fig. 1. Rollers 60, 61 may be conveniently supported on threaded stud members 62 projecting outward through holes in a ring 63 of V-shaped cross section. The rollers may, of course, be retained on studs 62 by suitable retaining nuts 62a or the equivalent. The V-ring 63 may be secured, as by tack-welding, to inner member 64 which seats on a plurality of projections 65 integral with the casing 3a. To permit assembly of the control ring 59a in position between rollers 60, 61, the ring must be formed in two or more arcuate segments, which may be bolted together by projecting flanges 66, 67.

It will now be apparent that circumferential shifting of the control ring 59 will cause the levers 53 to simultaneously rotate the rods 36. This circumferential shifting of the control ring may be effected by any suitable electrical or hydraulic motor means (not shown). In an actual power plant, this shifting will be accomplished by a motor under the control of a suitable regulating system. The specific regulator developed for adjusting this particular nozzle structure is disclosed more completely in the copending application of Neal E. Starkey, S.N. 252,916, filed October 24, 1951, now Patent No. 2,625,789, and assigned to the same assignee as the present application.

Perhaps the most important single problem encountered in variable nozzles of this type is that of preventing excessive leakage between the ends of the adjustable vanes 35 and the inner and outer walls with which they cooperate, without at the same time risking seizure between the vanes and their cooperating walls due to expansion and forced deflections of the parts, and due to deposits of dirt accumulating during operation. In the present arrangement, this is effected in the following manner.

The outer wall member with which the vanes cooperate is not a continuous annular ring but a plurality of segmental members, one of which is shown in section at 68, Fig. 1. The inner surface 68a is not a cylindrical surface about the axis of the power plant, but is spherical, with a center located on the axis of the rotor. The cooperating end of blade 35 has a spherical portion adapted to engage the spherical surface 68a, but the rearward or trailing edge portion of blade 35 is relieved somewhat to provide a clearance shown at 68b. This is to reduce the friction area between segment and blade and thus reduce the turning effort required from the positioning motor means, and to permit completely free differential thermal expansion between the comparatively thinner trailing edge of the blade relative to the segment 68. This avoids the possibility of imposing excessive compressive forces on the thin trailing edges of the blades when motive fluid is first admitted to the turbine, as might otherwise occur since the trailing edges will naturally heat up faster than the comparatively heavier section through which the rod 36 passes. This also allows shearing of any dirt deposits which may form on the end walls, with minimum torque on the blades.

In order to prevent axial shifting of the segments 68, as well as to prevent leakage of motive fluid around the outer surface thereof, each segment is provided with a radially projecting circumferentially extending tongue 68c, which is received in an annular groove in casing 3a. Interposed between the outer surface of segments 68 and the casing 3a is a thin segmental sheet metal band 69. An annular washer 70 is interposed between the outer surface of segmental band 69 and the end of bushing 37. To reduce heat transfer from the outer segment 68 to the bushing assembly, the outer surface of the segments may be recessed slightly to define clearance 68d, 68e, so that the segment 68 engages the band 69 only on an annular area immediately surrounding the rod 36.

The inner boundary of the motive fluid flow path is formed by a corresponding series of segments, one of which is shown in section at 71, Fig. 1. The number of segments 71 is, of course, equal to the number of segments 68 and in the present structure there are twenty-four adjustable blades 35, and twelve circumferential subdivisions of the segments 68, 71. In other words, there are two adjustable blades 35 for each cooperating pair of segments 68, 71. The outer surface of segment 71 is provided with a spherical surface 71a. This spherical surface also has its center at the axis of the power plant. Here, again, the trailing edge of the blade 35 is recessed to define a clearance space 71b, analogous to the clearance 68b described above.

The segments 71 are supported on the second inner casing member 3c by circumferentially extending flanges or dovetails 72, 73. It will be seen in Fig. 1 that these dovetails have axially projecting inner end portions projecting loosely into annular grooves defined in the side faces of circumferentially extending flanges 74, 75, respectively. Assembly of these segments 71 to the integral casing 3c is permitted by the fact that the segments are inserted radially into position relative to the flanges 74, 75 before the casing 3c is bolted to the first inner casing 3b. The axial dimensions of the grooves in the outer surface of casing 3c are such that the segments 71 can be assembled radially and then slid axially to the right so that the dovetails 72, 73 engage the flanges 74, 75, as shown in Fig. 1. When casing 3c is subsequently secured by bolts 17 to casing 3b, the circumferential flange portion 76 of casing 3c serves as a retaining wall for dovetails 16 of the segments 7a. At the same time the adjacent edge portion of segments 7a serve to prevent segments 71 from shifting to the left far enough to disengage from casing 3c.

Sealing against leakage between the ends of adjacent segments 71 is provided by the interlocking tongue and groove arrangement shown in Fig. 7. This view is taken in the direction of arrows 7—7, Fig. 2, and it will be seen that, with two exceptions, each segment 71 has a radially inner projecting portion, shown at 71f on segment 71c, while at the other end the segment is provided with a radially outer axially extending edge portion 71g. In order to permit assembly, one segment 71d, is provided at both ends with a radially inner edge portion 71f, while the next adjacent segment 71e is provided at both ends with radially outer edge portions 71h. With this arrangement, segment 71d is inserted first, then the segment 71c, and so on around the ring counterclockwise, until segment 71e is inserted last.

Means are provided for preventing excessive looseness of the segments 71, adjustable blades 35, segments 68, and related parts, as follows. It will be apparent in Fig. 2 that the outer surface of casing portion 3c between the flanges 74, 75 forms an annular recess 77 with the inner surfaces of segements 71. Air under pressure is supplied to this annular chamber by one or more passages, shown in Fig. 1 as being formed by drilled holes 78, 79. Air under pressure, as for instance from a suitable point in the compressor associated with the gas turbine power plant (not shown), is supplied by way of one or more of the hollow studs 4 to the passages 79, 78 and the chamber 77. Thus, there is built up in chamber 77 a fluid pressure tending to bias the segments 71 radially outward so that each segment 71 is held in engagement with the inner ends of the related blades 35. Also the outer ends of blades 35 are firmly pressed against the adjacent surface of segments 68, and the segments 68 are in turn biased against the band 69 and washers 70. Thus, the substantial degree of looseness required between these parts in order to permit free differential thermal expansion is prevented from introducing undesirable vibration of these parts in normal operation.

In order to prevent accidental displacement of these comparatively loose parts when the plant is shut down and during the starting process, additional spring biasing means may be associated with the inner segments 71. This spring biasing arrangement is seen more clearly in Fig. 2, and is omitted from Fig. 1 because of the small scale of the drawing.

The first spring is indicated at 80, being represented in end view in Fig. 2. This spring is actually an elongated leaf spring having a plan form as shown in Fig. 3 and bent to the shape shown in Fig. 4. As will be seen most clearly in Fig. 4, the central portion of the leaf spring is provided with an arcuate depression extending transversely across the spring. This recess is provided for the passage of a dowel pin shown partly in dotted lines at 81 in Fig. 2. This dowel is inserted through a drilled hole 82 in the casing flange portion 76 and projects through an arcuate recess formed in the segment flange portion 72, through a drilled hole in the casing flange portion 74, projects through the chamber 77, through an arcuate recess in the segment flange portion 73, and terminates in a drilled hole in casing flange portion 75. Once the casing portion 3c is bolted to casing 3b, the dowel pins 81 are, of course, prevented from leaving the position shown in Fig. 2. It will be apparent that they serve to maintain the segments 71 in longitudinal alignment relative to the casing 3c, against the action of the friction forces acting on the segments when the vanes 35 are caused to rotate. At the same time, the segment 71 is loosely supported for limited rocking movement about the pin 81 so that the end of the blade 35 can adapt itself to the surface of the resiliently supported segment 71. Since the leaf spring 80 is disposed between the dowel pin 81 and the outer surface of casing portions 3c, the spring is loosely retained in the position shown in Fig. 2. It will be obvious that the ends of the leaf spring 80 are biased upwardly against the under surface of segment 71 so as to hold it in engagement with the inner end surfaces of vanes 35. Thus, the radial clearances between the respective parts are held closed when the power plant is shut down so there will be no undue looseness during the starting cycle.

The resilient support for the segments 71 includes a second set of leaf springs, an end view of one of which is shown at 83, Fig. 2. The plan form of this spring is shown in Fig. 5, and it is bent to the shape shown in Fig. 6. For retaining this spring against circumferential displacement in the recess formed between flange 76 and flange 72, each leaf spring 83 may be provided with an axially projecting end tang 83a, which is received in a recess formed in the adjacent face of flange 72, as shown in Fig. 2. It will be apparent from a consideration of Fig. 2 that the function of these springs 83 is to bias the segment 71 axially to the right.

Fig. 2 actually represents the "cold" condition, in which springs 83 bias the flange 72 into engagement with the circumferentially extending packing teeth 74a machined on casing flange 74. When operation begins and the segment 71 begins to expand in an axial direction, the differential thermal expansion relative to the comparatively cooler casing portion 3c causes the clearance space shown at 73a to close up. Thereafter, further thermal expansion of segment 71 in an axial direction will result in a clearance space opening up between the teeth 74a and the flange 72. When the machine cools, segment 71 again grows shorter in the axial direction with the result that springs 83 bias it to the position shown in Fig. 2.

It may be noted that the segments 6a, 68, 7a, and 71 will ordinarily be made of a temperature-resisting alloy, such as an austenitic steel, while casing 3c is of a lower temperature alloy, such as a ferritic steel. Since the austenitic alloy has a much higher coefficient of thermal expansion, the above-described differential expansion effect is enhanced and will occur even when the parts are at the same temperature in normal operation.

It will be apparent that the dual pressure and leaf spring biasing arrangement insures that all parts of the variable nozzle arrangement will be held firmly in desired position when the machine is cool, yet permits them to freely expand in accordance with differential temperature changes when the machine comes up to normal operating temperature.

In addition to the biasing function described above, the pressurizing air admitted to chamber 77 performs the very important additional function of keeping clean the clearance spaces between the respective parts. It will be obvious that there will be some leakage from the chamber 77 past the packing teeth 74a and through the clearance space between flange 72 and segment 7a, as well as through the clearance identified 73a in Figure 2. This small outward flow of leakage fluid will prevent the entrance of carbonized fuel particles or other dirt entrained in the motive fluid. Without this cleaning function performed by the pressurizing fluid, foreign particles might build up in these clearance spaces to such an extent that free differential thermal expansion between the parts would be prevented.

With this arrangement, the nozzle parts are kept free to adjust themselves with respect to the movable blades 35, and to expand and contract in accordance with temperature changes.

Thus, it will be apparent that the invention provides a novel variable turbine nozzle construction in which complete freedom is permitted for the relatively movable parts to expand and contract in accordance with temperature changes and to provide a certain degree of self-aligning action between the segmental inner and outer wall portions and the cooperating end portions of the adjustable nozzle blades, while employing special spring and pressure biasing arrangements for holding the loosely fitted self-aligning parts firm against vibration.

While the invention has been described as applied to a high temperature turbine, those skilled in the art will appreciate that it may also have application to lower temperature turbines or to variable guide vanes in axial flow compressors. It will be obvious to those skilled in the art that many changes and substitutions of mechanical equivalents may be made. For instance, for operation in some temperature ranges the clearances between the movable parts may be made sufficiently small that the special spring biasing arrangement, including the leaf springs, 80, 83, may be dispensed with and the pressure biasing arrangement used alone. Likewise, many other arrangements for adjustably positioning the control rods 36 might be employed.

It is, of course, intended to cover by the appended claims all such modifications as fall within the true spirit and scope of the invention.

What we claim as new and desire to secure by Letters Patent of the United States is:

1. In a variable guide-blade arrangement for an axial flow turbo-machine, the combination of an annular outer casing, an annular inner casing assembly spaced radially from the outer casing to define a motive fluid flow path, a plurality of circumferentially spaced rotatably adjustable control rods supported in the outer casing with their axes substantially radial and their inner ends projecting into the fluid flow path and each carrying an airfoil-shaped blade for directing the flow of fluid, the inner casing assembly comprising first and second annular inner casing members, the radially inner wall of the fluid flow path being defined by a first circumferential row of arcuate segments loosely supported from the first inner casing member, the segment support means comprising a radially projecting flange portion extending inwardly from each segment and having an axially extending portion engaging an annular dovetail groove in an adjacent end surface of the first inner casing member, the second annular inner casing member being removably secured to said first inner casing member and having a radially extending flange portion overlying the adjacent radial surface of said segment support dovetail flanges whereby, when the first and second inner casing members are secured together, said segment support dovetail flanges are prevented from disengaging from said dovetail grooves, the second inner casing member supporting a second circumferential row of wall segments forming a second portion of the inner fluid flow path, each of said second-mentioned segments having at least one portion of spherical shape, the inner end of each blade being shaped to define constant clearance spaces with the abutting segment in all positions of the blade, each of said second row of wall segments being secured to the second inner casing member by a pair of axially spaced circumferentially extending dovetail flanges each including a radially inwardly extending wall portion and an inner end portion extending axially away from said first inner casing member and engaging circumferential grooves in a pair of cooperating axially spaced circumferentially extending flanges projecting radially outward from said second inner casing member, said first row of inner wall segments having circumferentially extending edge portions projecting axially towards the second row of inner wall segments and defining therewith a circumferential clearance space of such width that said second inner wall segments are prevented from moving toward the first row of segments sufficiently to disengage the dovetails supporting the second row of segments, said second inner casing member defining a pressure chamber between said axially spaced circumferentially extending dovetail flanges, and conduit means for supplying fluid under pressure to said pressure chamber whereby said spherical surfaces of the second row of segments are biased radially outward into engagement with the adjacent ends of the adjustable blades.

2. Variable guide-blade structure in accordance with claim 1 and including leaf spring means engaging the second inner casing member and biasing the second row of segments axially toward the segment support dovetail flanges of the second inner casing member.

3. Variable guide-blade structure in accordance with claim 1 and including leaf spring means disposed in the annular pressure chamber and having portions engaging the second inner casing member and the second row of inner wall segments for biasing said segments outwardly into contact with the blade end portions when the machine is inoperative and there is no biasing pressure fluid supplied to said chamber.

4. Variable guide-blade structure in accordance with claim 1 and including an axially extending dowel pin, there being one pin for each of the second row of wall segments, each pin being disposed through an axial hole in the first and second axially spaced radial flanges extending outwardly from the second inner casing member and terminating in a hole drilled part way through the third radial flange of the second inner casing member most remote from the first inner casing member, the cooperating segment being provided with cut-out portions in the dovetail flanges thereof, said cut-out portions being adapted to receive the dowel pin for maintaining axial alignment of the segment relative to the inner casing member, the clearances between said segment, the support flanges of the second inner casing member, and the adjacent edges of the first row of inner wall segments being sufficient to permit limited self-aligning adjustment of the second row of segments relative to the dowel pins.

5. In a variable guide-blade arrangement for an axial flow turbo-machine, the combination of an annular outer casing, an annular inner casing assembly spaced radially from the outer casing to define a motive fluid flow path therebetween, a plurality of circumferentially spaced rotatably adjustable control rods supported in the outer casing with their axes substantially radial and their inner ends projecting into the fluid flow path and each carrying an airfoil-shaped blade for directing the flow of fluid, said inner casing assembly comprising first and second annular inner casing members with means detachably securing the two together, means supporting the first inner casing member from the outer casing, the radially inner wall of the fluid flow path being defined in part by a circumferential row of arcuate wall segments each having at least one portion of spherical shape, the inner end of each blade being shaped to define constant clearance space with a spherical portion of an abutting segment in all positions of the blade, each of the wall segments being supported from the second inner casing member by a pair of axially spaced circumferentially extending dovetail flanges each including a radially inwardly extending wall portion and an inner end portion extending axially away from said first inner casing member and engaging circumferential grooves in a pair of cooperating axially spaced circumferentially extending flanges projecting radially outward from the second inner casing member, the first inner casing member having a circumferential edge portion projecting axially toward said row of segments and defining therewith a circumferential clearance space of such width that the segments are prevented from moving axially toward the first inner casing member a sufficient distance to disengage the cooperating dovetail flanges when the first and second inner casing members are secured together, the second inner casing member defining a pressure chamber between the circumferentially extending dovetail flanges, and conduit means for supplying fluid under pressure to said pressure chamber whereby the segments are biased radially outward into engagement with the adjacent ends of the adjustable blades.

BRUCE O. BUCKLAND.
GLENN B. WARREN.

References Cited in the file of this patent

UNITED STATES PATENTS

| Number | Name | Date |
|---|---|---|
| 2,412,365 | Sollinger | Dec. 10, 1946 |
| 2,488,867 | Judson | Nov. 22, 1949 |

FOREIGN PATENTS

| Number | Country | Date |
|---|---|---|
| 697,416 | Germany | Oct. 14, 1940 |
| 609,682 | Great Britain | Oct. 5, 1948 |